United States Patent [19]

Walter et al.

[11] Patent Number: 4,755,065
[45] Date of Patent: Jul. 5, 1988

[54] CAGE FOR A LINEARLY OR ROTATABLY MOVABLE GUIDED ROLLING BEARING AND THE RESPECTIVE BEARING

[75] Inventors: Lothar Walter, Schweinfurt; Uwe Mayer, Münerstadt; Ludwig Edelmann, Sulzthal, all of Fed. Rep. of Germany

[73] Assignee: SKF Linearsysteme GmbH, Schweinfurt, Fed. Rep. of Germany

[21] Appl. No.: 22,794

[22] Filed: Mar. 6, 1987

[30] Foreign Application Priority Data

Mar. 14, 1986 [DE] Fed. Rep. of Germany ....... 3608478

[51] Int. Cl.[4] .............................................. F16C 29/04
[52] U.S. Cl. ..................................... 384/47; 384/447; 384/572
[58] Field of Search ................. 384/47, 447, 619, 572, 384/580, 575, 576

[56] References Cited

U.S. PATENT DOCUMENTS 592,053 10/1897 Hunt .................................... 384/575
1,765,648 6/1930 Bott ..................................... 384/580
3,802,754 4/1974 Pitner ................................. 384/580

Primary Examiner—Lenard A. Footland
Attorney, Agent, or Firm—Rosen, Dainow & Jacobs

[57] ABSTRACT

A cage for a linear or rotationally guided rolling bearing has two uniformly spaced apart smooth boundary surfaces extending in the rolling direction, the cage having pockets adjacent one another in the rolling direction for receiving at least one rolling body. Each pocket has at least one recess pressed in the immediate vicinity of at least one edge in the opposed surfaces of the cage for the production of a holding groove. The walls of the holding groove closely surround dimensionally decreasing sections of the rolling bodies. Each holding groove is formed on the end of one or more holding tongues extending into the pockets. The recesses of the boundary surfaces are in the form of grooves with constant cross section, are pressed only in the holding tongues, and extend across the entire width of the holding tongues.

10 Claims, 6 Drawing Sheets

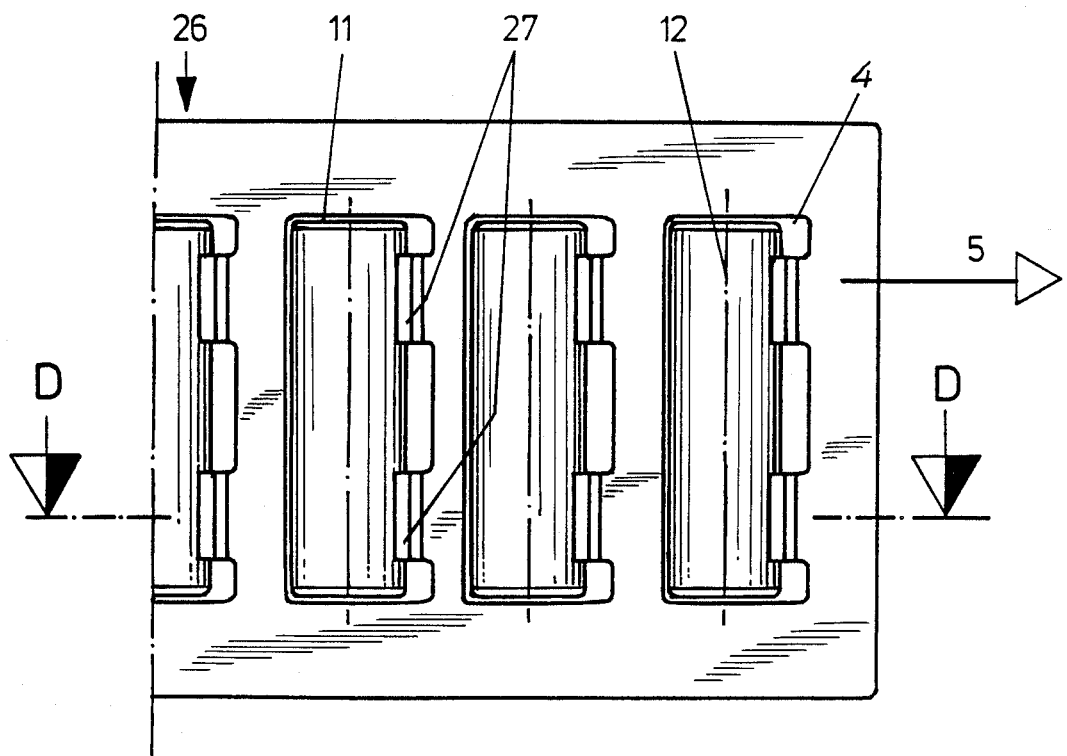
Fig. 8
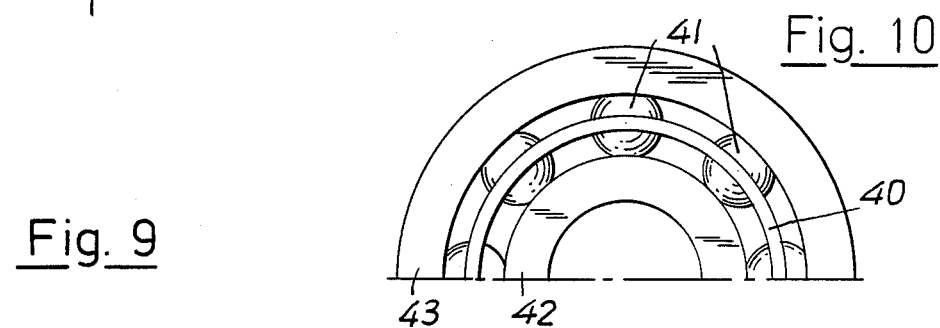
Fig. 10
Fig. 9
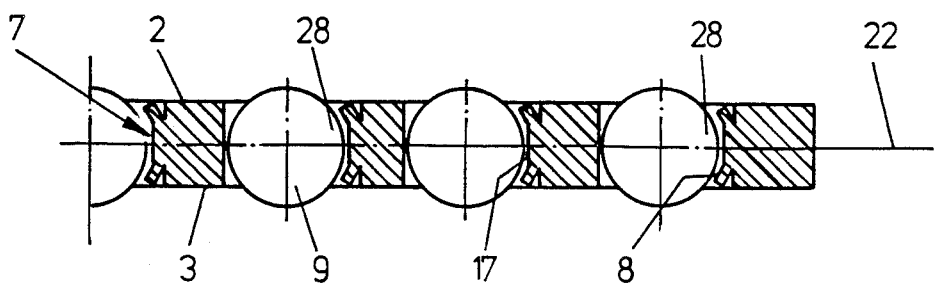

CAGE FOR A LINEARLY OR ROTATABLY MOVABLE GUIDED ROLLING BEARING AND THE RESPECTIVE BEARING

This invention relates to a cage for a linearly or rotatably movable guided rolling bearing, and to a rolling bearing incorporating such a cage.

In a known cage of the type to which the invention is directed, individual recesses are stamped into the opposite sides of two flat boundary surfaces of the strip material of the cage to form the adjacent edge surfaces of the pocket holding noses for the rolling bodies (FR-PS No. 11 37 577). These holding noses have inwardly projecting curved holding walls in the pockets, whose shape and accuracy of position are insufficient in many cases. The edges of the recesses also easily receive damaging cracks, since the material of the cage is not deformed uniformly in the stamping of the recesses along the pocket edges and is moved in a direction towards the rolling bodies unevenly.

In another known annular cage the recesses on the two sides of the cage are formed by stamping annular grooves in the two cylindrical boundary walls of the cage (DE-GM No. 1521 162). This annular groove, however, traverses the connection position of the guide webs arranged between adjacent pockets of the cage, so that the stability of the guide webs is severely weakened. As a result, in the stamping of the annular grooves the adjacent edge surfaces of the pockets in the region of the stiffening webs are less deformed than the region between two guide webs adjacent the circumference. The precision of the shape of the holding walls formed with this annular groove therefore likewise leaves much to be desired.

It is therefore an object of the invention to provide a cage for a linearly or rotationally movable rolling bearing of the above type having cage pockets which can be economically produced with exceptionally precisely shaped edges and holding walls. Moreover the cage should have a relatively high stability.

In accordance with the invention the cage is formed from a blank of a plastically deformable strip material and the edge surfaces of the pockets of the cage can be produced in the blank with accurate shapes by a surface pressing technique. The plastically deformable strip material can be for example aluminum, bronze or a plastic material.

After the stamping out of the pockets the rolling bodies can be inserted in the pockets of the cage and can be coaxially fastened in their pockets with the help of known devices.

In the final step of production of the cage, pressure formed grooves can be stamped, pressed or rolled in the opposite boundary surfaces (i.e. surfaces of the strip) of the cage, so that a holding groove is formed in the edge surfaces of the pockets adjacent the pressure formed grooves. The rolling bodies are consequently then partly surrounded by the two holding walls of the holding groove, so that they can not fall out of the pockets of the cage.

In forming of the grooves without cutting, it is necessary only that the spacing of the work tool from the adjacent edge surfaces of the pocket be accurately set. On the other hand the work tool which can be wider than the holder tongue positional deviation along the groove since the groove extends at its two ends in the pocket. The shape and accuracy of positioning of the holding groove is not affected as a result of such an indexing error of the work tool. The mass production of the cage with assembly line tools is thereby simplified.

Since the grooves are pressed only in the holding tongues, the guide webs of the cage have a uniform thickness and stability at their two connection positions with the cage sections that extend transverse to the rolling direction on both sides of the cage. In the rolling direction it is therefore permissible that the guide webs be relatively small without the danger that the guide webs break during operation of the rolling bearing. In this manner many rolling bodies can be accommodated in the cage in the rolling direction per unit length. The carrying capacity of a rolling bearing having a cage in accordance with the invention can therefore be correspondingly great.

In a further feature of the invention, each holding groove can have an intermediate section between the two holding walls, facing the rolling bodies, which is extremely stiff and can be sufficiently precisely produced with a profile stamp during the stamping out of the respective pocket.

In order that the invention may be more clearly understood, it will now be disclosed in greater detail with reference to the accompanying drawings, wherein:

FIG. 8 is a partial cross section of another modification of a cage in accordance with the invention, wherein a single roller is provided in each pocket, the roller having an axis lying in a central plane between the boundary surfaces;

FIG. 9 is a cross section taken along the line D—D of FIG. 8; and

FIG. 10 is a side view of a rotatably movable bearing incorporating the cage of the invention.

Figure 1:
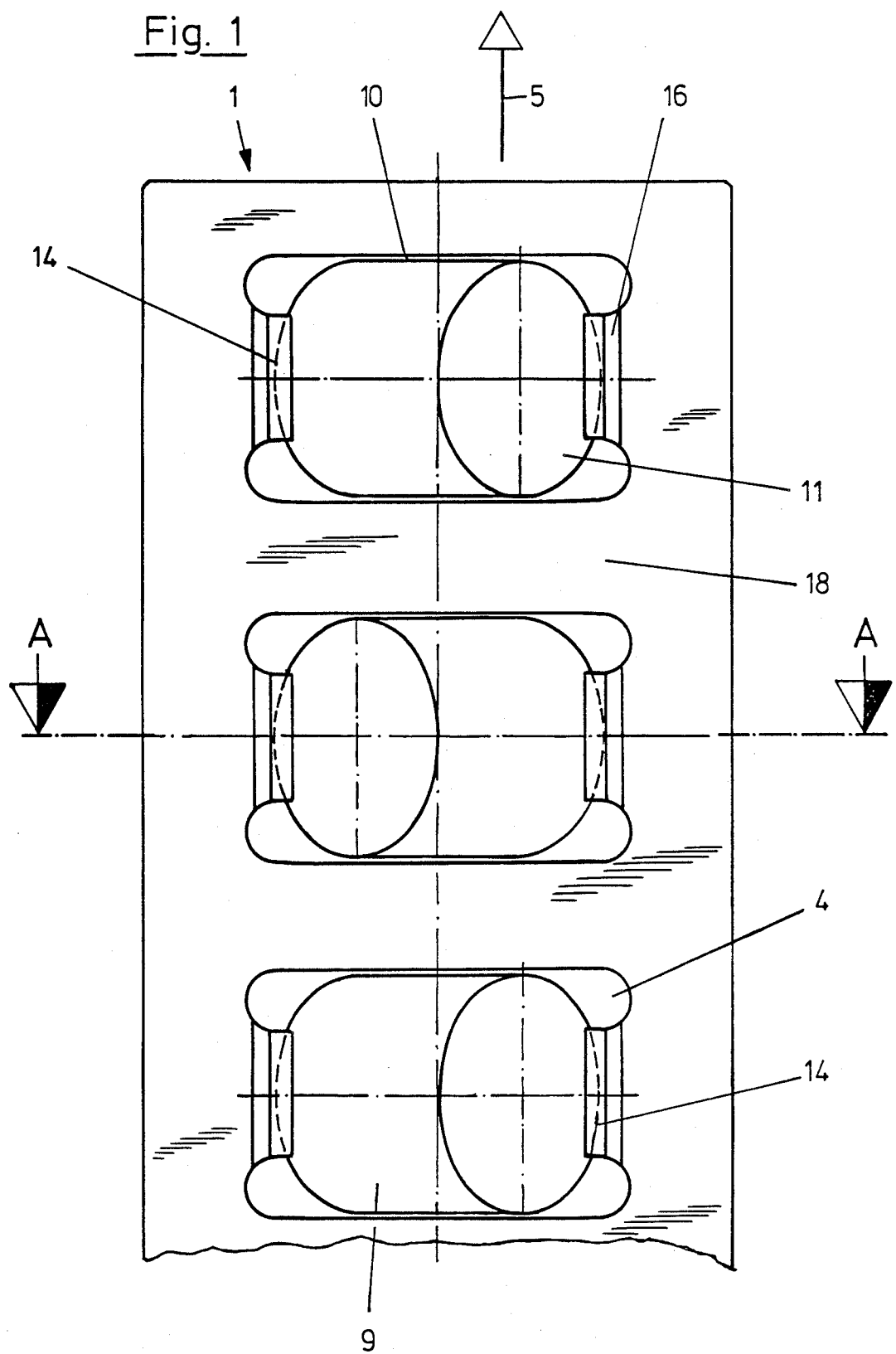
FIG. 1 is a partial plan view of a cage with a roller assembled in each pocket, with the rollers in each pocket arranged with their axes extending at an angle of 45 degrees to the boundary surfaces of the cage.
Figure 2:
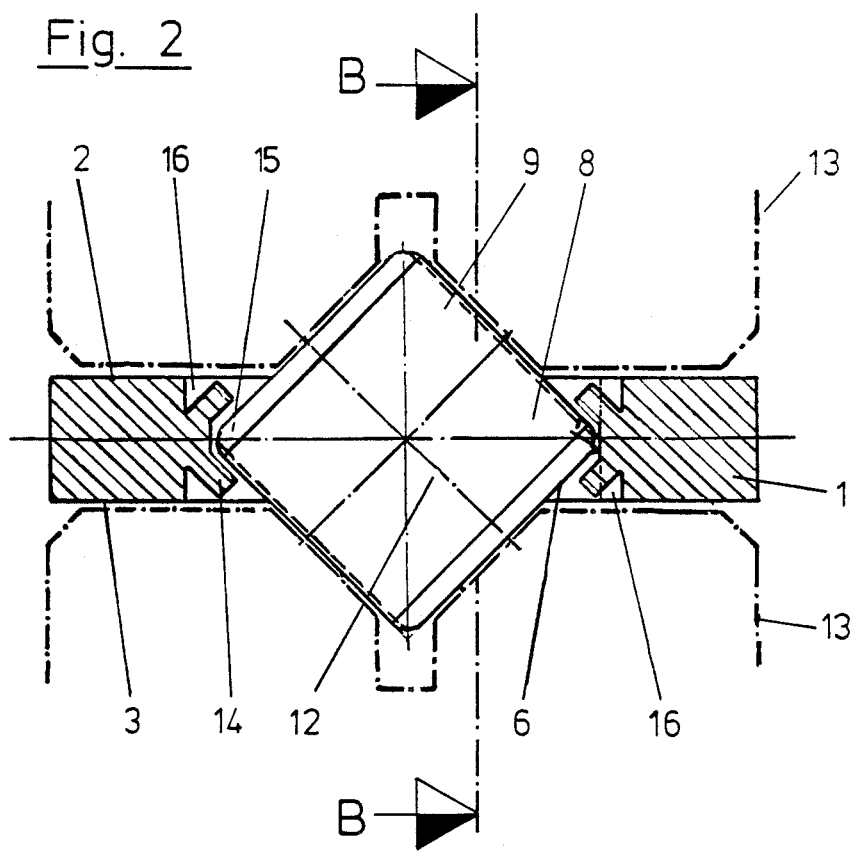
FIG. 2 is a cross section taken along the line A—A of FIG. 1.
Figure 3:
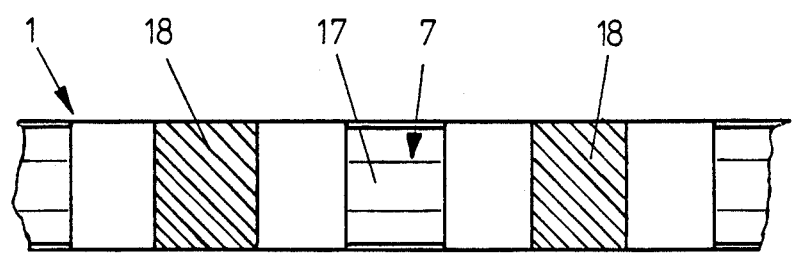
FIG. 3 is a cross section taken along the line B—B of FIG. 2, with the rollers omitted.

Referring now to the drawings, and more in particular to FIGS. 2 and 3, therein is illustrated a strip shaped cage 1 for a linearly movably guided crossed roller bearing 1. This cage is prepared from a plastically deformable aluminum band and has two mutually parallel, smooth boundary surfaces (band surfaces) 2,3.

The cage has several pockets 4 are arranged in a row extending in the rolling direction 5, the pockets being formed in the aluminum band of the cage by a punching process. Each pocket 4 has a pair of edge surfaces 6 opposite to one another in a direction transverse to the rolling direction 5. Each of the edge surfaces 6 has a holding groove 7 extending in the rolling direction 5, and each groove 7 has two holding walls 8. The rolling direction is the direction that the cage is adapted to move, in the operation of the bearing.

A rolling body 9 of rolling bearing steel and having a cylindrical roller surface 10 is assembled in each of the pockets. The rolling bodies each have opposed flat end surfaces 11. The rolling bodies rotate about their axes 12 which extend at angles of approximately 45 degrees to the planes of the boundary surfaces 2,3 of the cage. One group or portion of the rolling bodies 9 in the cage 1 have axes 12 which are arranged to extend at an angle of approximately 90 degrees with respect to the axes of another group or portion of the rolling bodies in the cage 1, i.e. the axes of the two groups of rollers extend in mutually perpendicular planes which are each at an angle of about 45 degrees to the planes of the surfaces 2,3. As illustrated, the rollers of the two groups may alternate in adjacent pockets of the cage.

In the above case the axes 12 of the row of rolling bodies extend to alternately cross one another. The rolling bodies 9 roll in a known manner on a V-shaped flat race of straight steel section rails 13 (illustrated in dash-dot lines in FIG. 2).

The holding grooves 7 are formed in the edge surface 6 of the facing ends of the holding tongues 14, which project toward one another from opposed side walls of the pockets, by forming pressure formed recesses or grooves 16 in the two boundary surfaces 2,3 at the bases of the tongues 14. Each pair of opposed grooves 16 is thereby located in the direct proximity to the edge surface 6 of the respective holding tongue 14.

Each rolling body 9 has a section 15 on its two ends that extend transversely of the rolling direction, the section 15 tapering toward the edge surface 6 of the cage 1 and being slidably guided on its outer end on these edge surfaces 6. Thereby by each of these two sections 15 is closely embraced on opposite sides by the two holding walls 8 of the holding groove 7. Accordingly the rolling bodies 9 can not fall out of the pockets 4 in the assembled condition of the cage 1.

The two sections 15 of each rolling body 9 in the above example are formed as projecting edge transitions of the cylindrical rolling surface 10 to the adjoining flat end surface 11.

The opposed grooves 16 of the boundary surfaces 2,3 of the cage are formed as grooves with constant cross section, are arranged only on the respective holding tongue 14 and extend across the entire width of the holding tongue.

In the illustrated example the cross sections of the grooves 16 are V-shaped, the grooves 16 being pushed into the two boundary surfaces 2,3, for example, with a knife-like chisel.

The process of pressing in the opposed grooves 16 results in the formation of the two holding walls 8 of each holding groove 7. Intermediate regions 17 in the end surfaces 6 remain between the two holding walls 8 of each holding groove 7. These intermediate regions extend in the rolling direction 5 and are not deformed by the pressing in of the grooves 16. These intermediate regions 17 form the bases of the holding grooves 7.

The depth of the two grooves 16 of each of the two holding tongues 14 of the pockets 4 amounts to about one third of the thickness of the cage 1 between its boundary surfaces 2,3.

The rolling surfaces 10 or the rolling bodies 9 are guided on the edges of the small webs 18 of the cage 1 that extend transversely to the rolling direction 5 between the rolling bodies and the rolling bodies are held with minimum guide play in the pockets.

Figure 4:
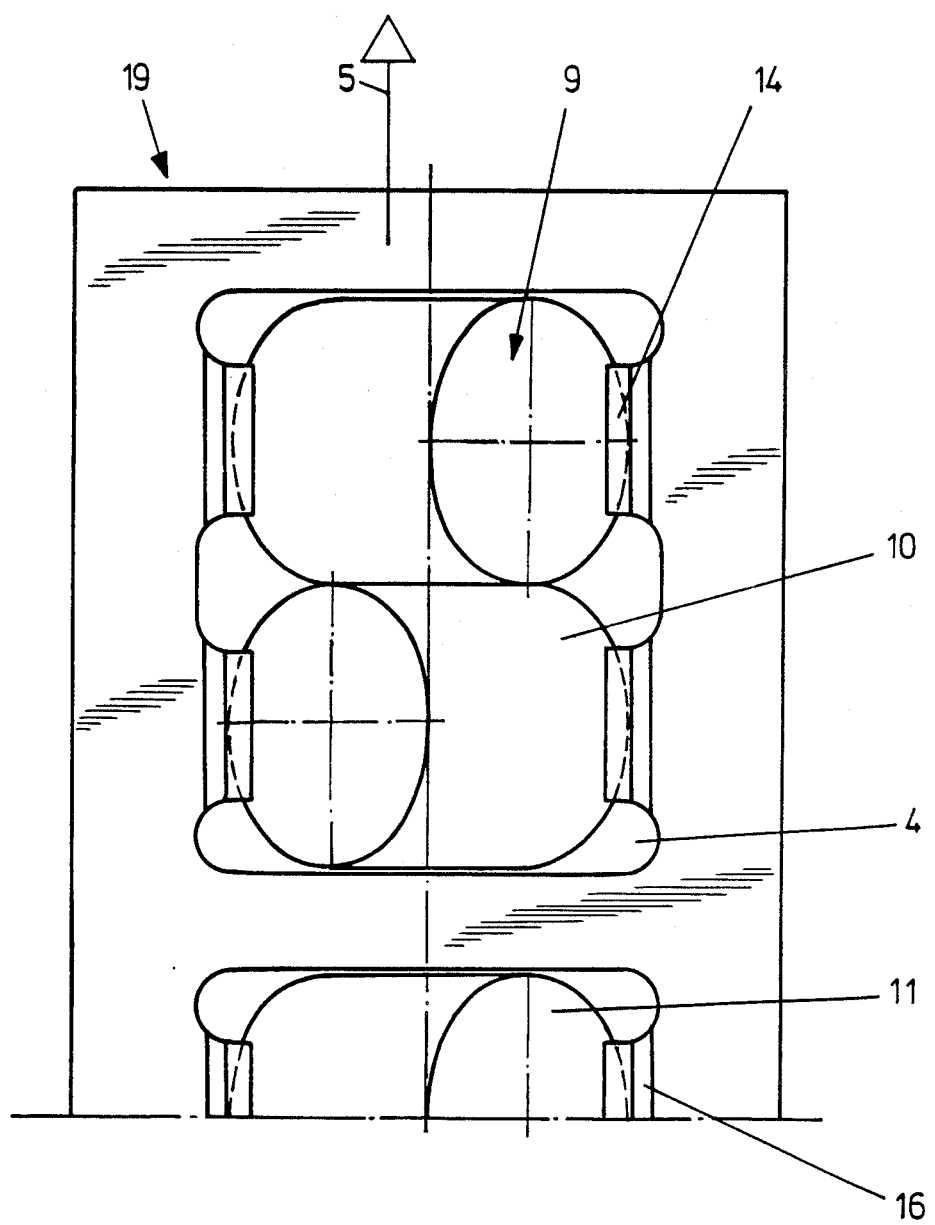
FIG. 4 is a partial plan view of a modified cage in accordance with the invention, with two rollers in each pocket which are arranged with their axes at an angle of 90 degrees to one another.

FIG. 4 illustrates a modification of the cage of a crossed roller bearing wherein each of the pockets 4 receive two rolling bodies 9, the axes of the rolling bodies in each pocket extending at angles of 90 degrees to one another (i.e. the axes are in planes that extend 90 degrees to one another). Each rolling body has a cylindrical rolling surface and two end surfaces 11 opposite one another.

Two spaced holding grooves are provided along each side of the pocket that extends in the rolling direction, in respectively spaced holding tongues 14, so that each roller is held in a separate pair of laterally opposed holding grooves of the pocket. Each of the two rolling bodies is supported at the center of its rolling surface 10 in the rolling direction 5 by the other respective roller.

Figure 5:
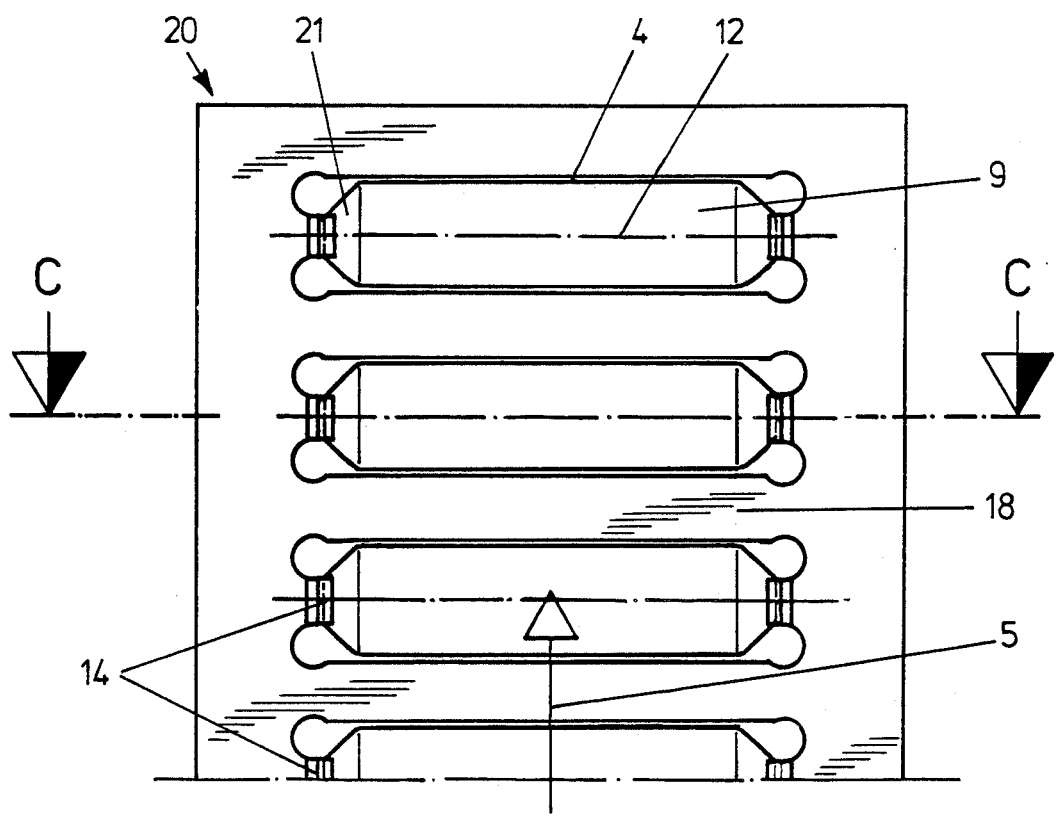
FIG. 5 is a partial plan view of a still further modification in accordance with the invention, with a cage in each pocket, whose axis extends in a central plane intermediate the two boundary surfaces of the cage.
Figure 6:
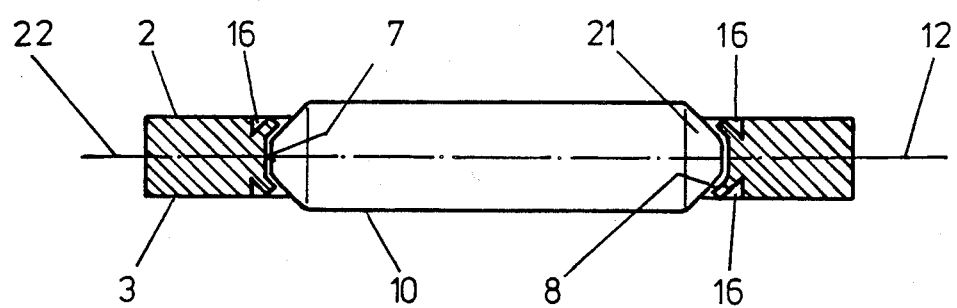
FIG. 6 is a cross section taken along the line C—C of FIG. 5.

In the cage 20 of the embodiment of the invention illustrated in FIGS. 5 and 6, each of the pockets receive, as a rolling body 9, a roller having a cylindrical outer surface 10 and a rotationally symmetrical frustoconical projection 21 on each end thereof. The axis 12 of each of the rolling bodies lays in a central plane 22 intermediate the two flat boundary surfaces 2,3 of the cage 20.

The two opposite projections 21 on the rolling bodies 9, extending transversely of the rolling direction 5, form a section which decreases toward the edge surface of the end of each holding tongue 14 that projects into the respective pocket 9.

Furthermore, two grooves 16 are pressed or stamped in each holding tongue 14, the grooves 16 extending in the rolling direction 5 and being arranged in the immediate vicinity of the edge surfaces of the ends of the holding tongues 14 that extend parallel thereto.

The grooves 16 extend through the entire width of the respective holding tongues 14 and have a constant cross section. They form a holding groove 7 with two holding walls 8, extending in the rolling direction 5, on the edge surface of the holding tongues 14. Each projection 21 of the respective rolling bodies 9 is closely surrounded in part on its conical end by the holding walls 8.

Figure 7:
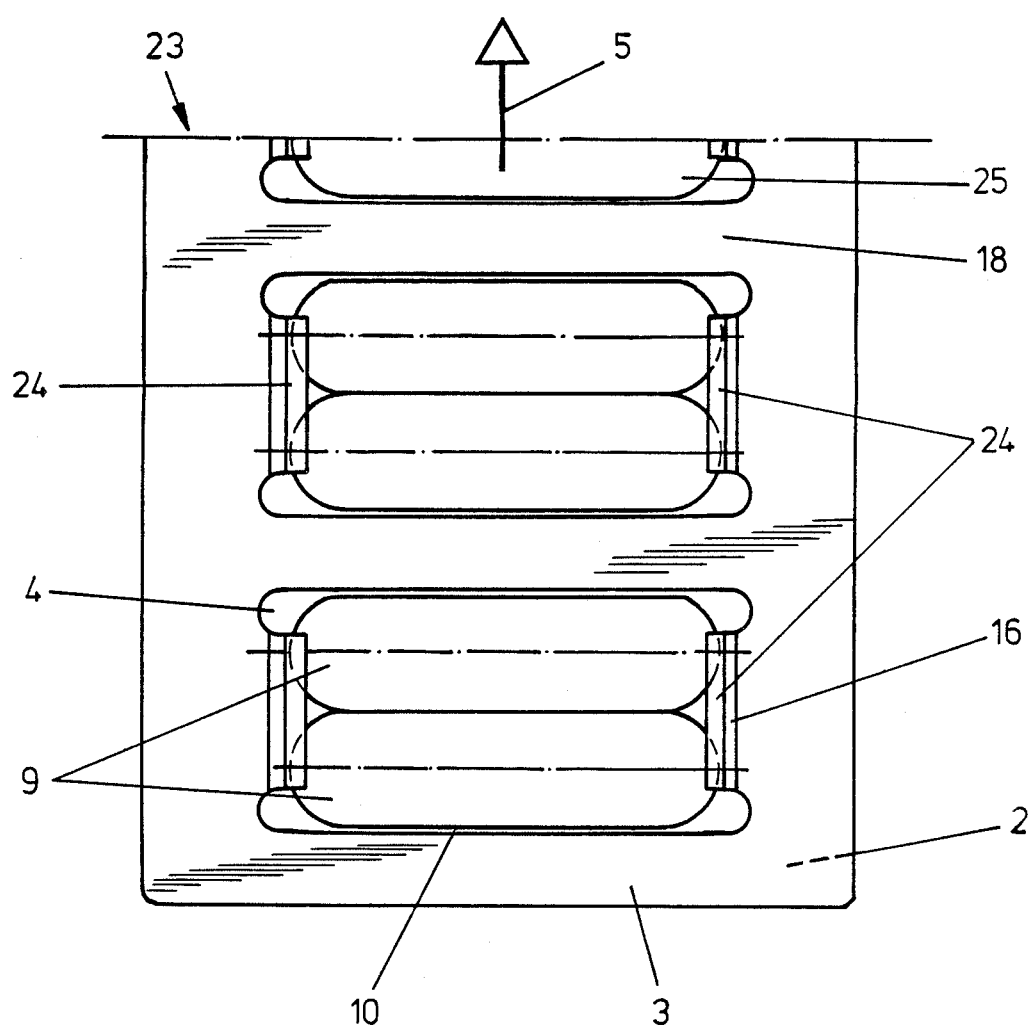
FIG. 7 is a partial plan view of a still further modification of a cage in accordance with the invention, having two rollers in each pocket, the axes of the rollers lying in a central plane between the two boundary surfaces and extending parallel to one another.

FIG. 7 illustrates a further embodiment of the invention, having a cage 23 which is similar to the cage 20 of FIGS. 5 and 6. This modified cage, however, has two rolling bodies 9 in each pocket 4. The two rolling bodies contact one another along their cylindrical rolling surfaces 10. Both rolling bodies 9 have at each end an outwardly decreasing hemispherical shaped section 25. Each section 25 is directed toward an edge surface of a common holding tongue 24, in which a holding groove is formed, whose holding walls closely surround the sections 25 of the two rolling bodies 9.

In order to form these holding grooves 7 two grooves 16 extending in the rolling direction 5 and having constant cross section are pressed into the two boundary surfaces 2,3 of the holding tongues 24. These grooves 16 extend throughout the entire width of the holding tongues 24.

FIGS. 8 and 9 illustrate a further modification of the invention, wherein the cage 26 is illustrated with two flat boundary surfaces 2,3 having substantially rectangular pockets 4 arranged adjacent one another in the rolling direction 5. Each pocket 4 receives a rolling body 9 in the form of a roller having a cylindrical rolling surface 10 and two flat end surfaces 11.

Two adjacent holding tongues 27 are provided in each pocket, on the side of the respective pocket transverse to the rolling direction, on the side of the respective pocket in the rolling direction, i.e. the leading edge of the pocket as the cage is moved, the two projections extending into the respective pocket in the direction opposite the rolling direction 5. The opposite sides of the pockets, i.e. the trailing edges thereof, are straight smooth edges adapted to engage the rolling surfaces of the rollers with minimum guide play.

The axis 12 of each rolling body extends in a central plane 22 intermediate the two flat boundary surfaces 2,3 of the cage 26.

In this case the section 28 that decreases toward the edge surface of the two holding tongues 27 is a part of the rolling surface 9 of the rolling bodies 10, which are opposite the respective holding tongues 27 and which engage the holding grooves 7 of the holding tongue 27 that extend transverse to the rolling direction 5. This part of the rolling surface 10 is closely surrounded by the two holding walls 8 of the holding groove 7, so that the rolling bodies 9 can not fall out of the pockets 4 in the assembled condition of the cage 26.

The construction of bearings in accordance with the above description of embodiments of the invention can be modified. Thus it is not necessary for the two boundary surfaces of the cage to be flat. They can alternatively be concentric and cylindrical and thereby extend axially parallel to one another, as illustrated in FIG. 10, so that the cage is annular and can be installed in known manner in a bearing guided for rotating movement. Thus, the bearing of FIG. 10 is provided with an annular cage 40 with pockets formed in the above discussed manner for receiving the rolling elements 41, which may be for example cylindrical or spherical, the folling elements rolling between an inner ring 42 and an outer ring 43 in conventional manner.

The respective rolling bearing can also be in the form of a self aligning roller with spherical roll surfaces, such as balls, and snapped in correspondingly shaped pockets of the cage of the invention.

What is claimed is:

1. In a cage for a roller bearing, the cage being of a plastically deformable material and having two uniformly spaced apart smooth boundary surfaces extending in the rolling direction of the cage, and pockets adjacent one another in the rolling direction for receiving at least one rolling body, each pocket having at least one end surface adapted to slidingly engage a section of decreasing dimension of the respective roller, and at least one holding groove in the cage resulting from depressions pressed in the cage from opposite sides in the immediate vicinity of the edge surface, whereby the holding groove defines a pair of holding walls closely surrounding said section of said roller; the improvement wherein said holding walls of the holding groove of the pocket are formed on the end of one or more holding tongues projecting into pocket from at least one edge thereof, and wherein the respective opposed depressions of the boundary surfaces of the cage comprise second grooves with constant cross section in the holding tongues, said second grooves extending over the entire width of the respective holding tongues.

2. The cage of claim 1 wherein an intermediate region is provided between the two holding walls of each holding groove, that is not deformed by the pressing of the cage to form the holding grooves.

3. The cage of claim 1 wherein the cross section of the second grooves of each holding tongue is substantially V-shaped.

4. The cage of claim 1 wherein the depth of each of the two opposed second grooves of the pockets of the cage is substantially equal to one third of the thickness of the cage between said boundary surfaces.

5. In a rolling bearing comprising a cage having uniformly spaced apart boundary surfaces and pockets for receiving rolling elements, wherein the rolling elements comprise rollers having two opposite ends and rolling surfaces rotatable about their axes, the improvement comprising holding grooves, extending in the rolling direction of the cage in holding tongues that project into the sides of the pockets, thereby forming pairs of holding walls defined by the respective holding grooves, said rolling elements having sections of decreasing dimension on the sides thereof transverse to the rolling direction that are surrounded by the two holding walls of the respective holding grooves, the axes of said rolling elements forming angles of substantially 45 degrees with the boundary surfaces of the cage, and wherein the decreasing sections comprise edge transitions of the rolling surface and the adjoining ends of the roller that project in a direction transverse to the rolling direction.

6. The rolling bearing of claim 5 wherein a portion of the rollers in the cage have axes which are at an angle of substantially 90 degrees with respect to the axes of another portion of the rollers.

7. The rolling bearing of claim 5 wherein the rolling surface of the rolling body is cylindrical.

8. In a rolling bearing comprising a cage having uniformly spaced apart boundary surfaces and pockets for receiving rolling elements, wherein the rolling elements comprise rollers having two opposite ends and rolling surfaces rotatable about their axes, the improvement comprising holding grooves, extending in the rolling direction of the cage in holding tongues that project into the sides of the pockets, thereby forming pairs of holding walls defined by the respective holding grooves, said rolling elements having sections of decreasing dimension on the sides thereof transverse to the rolling direction that are surrounded by the two holding walls of the respective holding grooves, the axes of said rolling elements extending in a central plane between the boundary surfaces of the cage and wherein the two sections of decreasing dimension of each roller are projections on the end of each roller and rotationally symmetrical to the axis of the respective roller.

9. In a rolling bearing comprising a cage having uniformly spaced apart boundary surfaces and pockets for receiving rolling elements, wherein the rolling elements comprise rollers having two opposite ends and rolling surfaces rotatable about their axes, the improvement comprising holding grooves, extending in the cage in holding tongues that project into the pockets, thereby forming parts of holding walls defined by the respective holding grooves, said rolling elements having sections of decreasing dimension that are surrounded by the two holding walls of the respective holding grooves, the axis of said rolling elements extending in a central plane between the two boundary surfaces of the cage, and wherein the section of decreasing dimension of each of the rolling elements comprises a rolling surface of the rolling element extending into the holding groove in the rolling direction or opposite the rolling direction.

10. The rolling bearing of claim 9 with in each case an in one pocket of the cage assembled rolling body, the improvement wherein the holding tongue of each pocket of the cage is arranged on only one of the two edges of the cage in or opposite the rolling direction.

* * * * *